(12) United States Patent
Hoornaert et al.

(10) Patent No.: US 8,949,608 B2
(45) Date of Patent: Feb. 3, 2015

(54) FIELD PROGRAMMABLE SMART CARD TERMINAL AND TOKEN DEVICE

(75) Inventors: Frank Hoornaert, Leefdaal (BE); Mario Houthooft, Melle (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 2171 days.

(21) Appl. No.: 09/789,197

(22) Filed: Feb. 20, 2001

(65) Prior Publication Data
US 2001/0054148 A1    Dec. 20, 2001

Related U.S. Application Data

(60) Provisional application No. 60/183,640, filed on Feb. 18, 2000.

(51) Int. Cl.
*H04L 9/32*          (2006.01)
*G07F 7/08*          (2006.01)
(Continued)

(52) U.S. Cl.
CPC .......... *G07F 7/0886* (2013.01); *E21B 41/0042* (2013.01); *G06F 21/34* (2013.01); *G06K 7/0013* (2013.01); *G06K 7/006* (2013.01); *G06Q 20/341* (2013.01); *G07F 7/1008* (2013.01)
USPC ............... 713/172; 713/168; 726/9; 235/380; 235/382

(58) Field of Classification Search
USPC ........ 713/176, 200, 185, 168, 172; 726/20, 9; 235/380, 382
See application file for complete search history.

(56) References Cited

U.S. PATENT DOCUMENTS

| 4,590,365 A | 5/1986 | Okada |
| 5,412,726 A | 5/1995 | Nevoux et al. |

(Continued)

FOREIGN PATENT DOCUMENTS

| AU | 672239 B2 | 5/1994 |
| GB | 2338329 | 12/1999 |

(Continued)

OTHER PUBLICATIONS

PCT Search Report for Int'l Appl. No. PCT/US01/05331, mailed May 8, 2001.

(Continued)

*Primary Examiner* — Yin-Chen Shaw
(74) *Attorney, Agent, or Firm* — RatnerPrestia

(57) ABSTRACT

The invention defines a digital programmable smart card terminal device and token collectively known as the token device. The token device comprises a field programmable token device which accepts a users smart card. The combination of token device and smart card may then be used for a variety of applications that include user authentication, secure access, encryption. One specific application is that of an electronic wallet. The token device can be used both in connected and unconnected modes. In one embodiment, the invention comprises a field programmable electronic smart card terminal for allowing secure communication between a user and a host service, service provider, or application, comprising a token personality logic; and, a smart card reader adapted to receive and communicate with a smart card having stored thereon a user identification data, wherein with a smart card received by said smart card reader said token personality logic can generate a token device personality using said user authentication data; and, a communications mechanism for communicating an element of said token device personality to a service or application. Since the smart card terminal only gains its token personality when a smart card is inserted, manufacture and distribution of the terminal on a wide scale is possible.

81 Claims, 9 Drawing Sheets

(51) Int. Cl.
*E21B 41/00* (2006.01)
*G06F 21/34* (2013.01)
*G06K 7/00* (2006.01)
*G06Q 20/34* (2012.01)
*G07F 7/10* (2006.01)

(56) References Cited

U.S. PATENT DOCUMENTS

| | | | |
|---|---|---|---|
| 5,479,512 A | 12/1995 | Weiss | |
| 5,485,519 A | 1/1996 | Weiss | 380/23 |
| 5,521,966 A | 5/1996 | Friedes et al. | |
| 5,613,159 A | 3/1997 | Colnot | |
| 5,625,534 A * | 4/1997 | Okaya et al. | 361/679.32 |
| 5,679,945 A * | 10/1997 | Renner et al. | 235/492 |
| 5,802,176 A | 9/1998 | Audebert | 380/23 |
| 5,884,292 A | 3/1999 | Baker et al. | |
| 5,887,131 A | 3/1999 | Angelo | |
| 5,889,941 A * | 3/1999 | Tushie et al. | 713/200 |
| 5,937,068 A | 8/1999 | Audebert | 380/23 |
| 5,943,423 A * | 8/1999 | Muftic | 705/67 |
| 5,988,510 A | 11/1999 | Tuttle et al. | 235/492 |
| 6,065,679 A * | 5/2000 | Levie et al. | 235/462.47 |
| 6,070,796 A | 6/2000 | Sirbu | |
| 6,129,274 A | 10/2000 | Suzuki | |
| 6,145,739 A * | 11/2000 | Bertina et al. | 235/380 |
| 6,196,459 B1 * | 3/2001 | Goman et al. | 235/380 |
| 6,234,389 B1 * | 5/2001 | Valliani et al. | 235/380 |
| 6,351,813 B1 * | 2/2002 | Mooney et al. | 713/185 |
| 6,393,563 B1 * | 5/2002 | Maruyama et al. | 713/155 |
| 6,442,532 B1 * | 8/2002 | Kawan | 705/36 R |
| 6,484,260 B1 | 11/2002 | Scott et al. | |
| 6,550,683 B1 * | 4/2003 | Augustine | 235/462.45 |
| 6,564,995 B1 * | 5/2003 | Montgomery | 235/379 |
| 6,694,436 B1 | 2/2004 | Audebert | |
| 7,100,199 B2 * | 8/2006 | Ginter et al. | 726/4 |
| 7,606,401 B2 * | 10/2009 | Hoffman et al. | 382/124 |
| 2002/0139861 A1 * | 10/2002 | Matsumoto et al. | 235/492 |
| 2002/0175207 A1 * | 11/2002 | Kashef et al. | 235/380 |
| 2003/0065653 A1 * | 4/2003 | Overton et al. | 707/3 |

FOREIGN PATENT DOCUMENTS

| | | |
|---|---|---|
| WO | WO 95/04328 | 2/1995 |
| WO | WO 97/07448 | 2/1997 |
| WO | WO-98/16908 | 4/1998 |
| WO | WO-9956429 | 4/1999 |
| WO | WO-9962037 | 12/1999 |

OTHER PUBLICATIONS

CA Office Action dated Aug. 6, 2012 for CA application No. 2,400,440.

European Search Report for EP 10186185.4 dated May 16, 2012.

Rankl et al., "Handbuch der Chipkarten, Passage," Handbuch Der Chipkarten. Aufbau—Funktionsweise—Einsatz Von Smart Cards, Muenchen: Carl Hanser Verlag, DE, Jan. 1999, pp. 171-177. XP002322130.

Rankl et al., "Handbuch der Chipkarten," Handbuch Der Chipkarten. Aufbau—Funktionsweise—Einsatz Von Smart Cards, Muenchen: Carl Hanser Verlag, DE, Jan. 1999, pp. 595-612. XP002174265.

Rankl et al., "Handbuch der Chipkarten, Mikroprozessorkarten, Speicherorganisation," Handbuch Der Chipkarten. Aufbau—Funktionsweise—Einsatz Von Smart Cards, Muenchen: Carl Hanser Verlag, DE, Jan. 1999, pp. 11-16, 50. XP002523430.

Menezes et al., "Handbook of Applied Cryptography Key Establishment Protocols," Handbook of Applied Cryptography; [CRC Press Series on Discrete Mathematices and Its Applications], CRC Press Series on Discrete Mathematics and Its Applications, Boca Raton, FL, US. Jan. 1997, pp. 4189-4541. XP 002304953.

Canadian Office Action for CA 2,400,440 mailed Mar. 20, 2014.

* cited by examiner

FIELD PROGRAMMABLE SMART CARD TERMINAL AND TOKEN DEVICE

CROSS REFERENCE TO RELATED APPLICATIONS

This application claims priority from provisional application "Factory to Field Programming and Advances Relating to Digipass 100/800/Series and Related Tokens", application No. 60/183,640, filed Feb. 18, 2000 and incorporated herein by reference.

The present application is related to the following United States Patents and Patent Applications, which patents/applications are assigned to the owner of the present invention, and which patents/applications are incorporated by reference herein in their entirety:

U.S. Pat. No. 4,599,489, entitled, "Solid State Key For Controlling Access To Computer Software";

U.S. Pat. No. 4,609,777, entitled, "Solid State Key For Controlling Access to Computer Software";

U.S. Pat. No. 4,819,267, entitled, "Solid State Key For Controlling Access to Computer Systems And To Computer Software And/Or For Secure Communications"; and U.S. patent application Ser. No. 09/500,533, entitled "Security Access And Authentication Token With Private Key Transport Functionality", filed Feb. 9, 2000.

FIELD OF THE INVENTION

The invention relates generally to digital devices and to electronic smart cards typically used for secure applications.

BACKGROUND

A "smart card" is a common term used to refer to a card-like device, typically of the size of a credit card, that includes stored thereon a set of data, which is often specifically related to the bearer or user of the card. Smart cards often contain their data stored by means of magnetic storage (a "swipe strip" or "mag stripe") or in a read-only memory (ROM) or random access memory (RAM), and usually include either a central processing unit (CPU) or a stored set of instructions in order to provide some degree of intelligence. The smart card arena has grown in recent years to include a variety of users and available applications. One such example is the banking world, where banks, brokerages, and other financial institutions have introduced the use of smart cards as electronic wallets for making electronic purchases and electronic payments.

A problem with the traditional type of electronic wallet is that the wallet needs to be charged, i.e., money needs to be 'loaded' into them, prior to use. Currently, one of the methods for loading electronic wallets is by using automated teller machines (ATM's) that have been specially adapted for this purpose, or through the use of special publically accessible dedicated card loading devices. In some cases, specialized public telephones may be used to make a telephone call with the smart card, and also to load the electronic wallet.

The same banks and financial institutions that currently support or anticipate supporting the use of smart cards have already implemented a lot of homebanking services such as phonebanking, PC banking, and Internet banking. A typical desired requirement of these applications is that they not be bound or restricted to being used at a restricted place or time. This is commonly referred to as the "triple A concept"—that the application be accessible anywhere, anytime, anyhow. To allow this flexibility while at the same time ensuring adequate controls and security, these homebanking applications normally require the user to use a digital token—a secure mechanism by which to identify a user or to encrypt the user's communications with the bank.

Token-based authentication is implemented with a dynamic client credential, or simply a dynamic credential. One specie of a dynamic credential is a dynamic password. One example of a dynamic password is a one-time password. Dynamic credentials are cryptographically derived from a base secret (which is "known" only to the client or, more precisely, the client's token and the authentication server) and from a dynamic variable (which is explicitly or implicitly known to both client and server, possibly within certain margins of uncertainty or accuracy). Examples of the dynamic variable include a challenge generated by the server, a counter, a time value. When the data used to generate a dynamic credential includes a challenge generated by the server, the credential may be called a "response". When the data used to generate the dynamic credential includes transaction data, the credential may be called a "signature".

There is today a large demand to use the existing smart cards already in circulation to support new remote banking applications. This demand is spurred largely by a desire to create a return on investment already made by various banking organizations, but also by a desire to get the user acquainted with his/her electronic wallets and to encourage its use in a variety of different ways at an increasing number and variety of establishments. There also exists today a combined demand to offer to banking customers a homebanking feature together with an ability to remotely load the smart card. Such loading devices are currently available in the marketplace but they are expensive because they need to be specially adapted for each different banks loading or payment scheme, and require specialized applications to be installed within the internal operating software of the device.

To encourage the growth of secure smart card technology within society, and to provide a satisfactory return on investment for those industries, such as the banking industry, which have historically been early adopters of the smart card format and its applications, a method is clearly needed to allow rapid, easy, and low-cost distribution of smart card technology and their associated readers, to the widest available audience or marketplace.

SUMMARY OF THE INVENTION

To satisfy this demand for an easily manufactured and distributable smart card technology the invention provides a field programmable user authentication device, electronic token, or token device. In accordance with the invention, several embodiments of such devices are supported, herein commonly referred to as a "token device."

The inventors have identified at least two different potential users of the invention, depending on their existing infrastructure:

1. Those customers that have already invested in traditional smart card readers but wish to add token functionality in order to support remote access, a feature not implemented in their traditional smart card technology; and,
2. Those customers that may have invested in smart card technology but not in the infrastructure needed (i.e. the terminals, readers and associated server technology) to support distributed users at home.

In the case where the organization has already invested in smart cards and applications but needs a reader for distribution to their customers, the invention provides a generic token device. In one embodiment this generic token device is a self-powered unit that accepts smart cards, and has both an integrated display and keyboard. It can work in a connected or non-connected way. In a non-connected mode the user selects which applications to run and provides inputs (personal identification numbers, etc.) if required. In a connected mode the token device acts as a slave to the users personal computer (PC). The PC makes interrogatories, asking questions, and the token provides answers.

In one embodiment, the invention comprises a field programmable electronic smart card terminal for allowing secure communication between a user and a host service, service provider, or application provided by a service provider, comprising a token personality logic; and, a smart card reader adapted to receive and communicate with a smart card having stored thereon a user identification data, wherein with a smart card received by said smart card reader said token personality logic can generate a token device personality using said user authentication data; and, a communications mechanism for communicating an element of said token device personality to a service or application.

In another embodiment, the invention comprises A method of accessing a secure application, comprising the steps of: providing a generic smart card reader terminal, wherein said generic smart card reader terminal includes:
a generic token personality logic, a smart card reader adapted to receive and communicate with a smart card, and, a communications mechanism for communicating said token device personality to a host service; receiving at said generic smart card reader a user smart card having stored thereon a user identification data; generating a token device personality using said user authentication data; and, accessing a secure application using an element of said token device personality.

In a further embodiment, the invention comprises a method of allowing a user secure access to a service provider application, comprising the steps of: distributing to a plurality of users a plurality of generic smart card reader terminals, wherein each of said generic smart card reader terminals includes:
a generic token personality logic, a smart card reader adapted to receive and communicate with a smart card, and, a communications mechanism for communicating said token device personality to a host service; receiving at said generic smart card reader a user's smart card having stored thereon a user identification data; allowing a user to generate a token device personality using said user authentication data; and, allowing said user to access a secure application provided by a service provider, using an element of said token device personality.

DETAILED DESCRIPTION

Traditional user access devices which are used for accessing financial systems, such as point of sale terminals, electronic tokens, trusted wallets, and banking cards, utilize a long and complex method of distribution. This is because a central system or service provider must keep track of the different secrets and/or personal identification numbers (PIN's) that are distributed to which customer and on what terminal. One target market for the present invention are the owners of such systems that are either originally smart card based, or are token based but the owner wishes to switch to a smart card.

An advantage of the present invention is that it can take advantage of such existing infrastructure without requiring the new installation of terminals. The smart card reader or smart card terminal provided by the invention can be used as a token that needs no programming of user-specific secrets. As used herein, the terms "user" and "cardholder" are used to refer to the user of the smart card or token device. This is typically an end-user or client of a bank or financial institution who has been issued with a personal smart card. As used herein the terms "system owner" and "service provider" are used to refer to such banks, financial institutions, and other vendors who provide a service to the cardholder, while the terms "service", "host service", and "application" are used to refer to the various services or applications a service provider may make available to the user. Instead of preprogramming, the secret values used for authentication and user-host communication are instead derived from external parameters, such as identification data or secret values stored on the smart card itself (for example the card's serial number). The advantage of this procedure is that the smart card terminal can be shipped and put into distribution directly from the factory. A subscribing user gets his terminal and enters his card and the parameters, and secrets are set accordingly, creating a token. The invention is intended to be a mass product, which can be factory pre-set for a specific system owner or service provider such as a particular bank or financial institution. Such pre-sets are collectively referred to herein as a "scheme" which allows different banks to personalize the working of their own token system. The delivered terminal/token device for each system owner are all identical and are intended to go straight to the points of distribution. This provides a great advantage in speed and ease of distribution over prior methods.

Personalized Token

Figure 1:
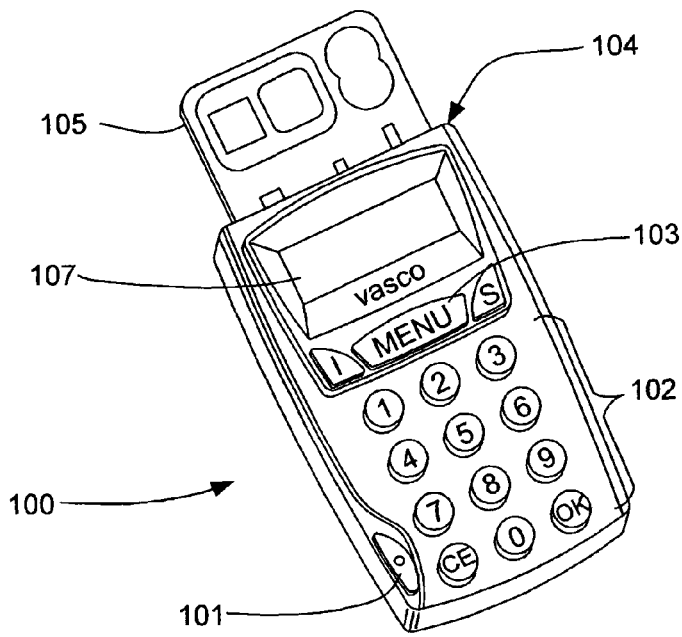
FIG. 1 is an illustration of a token device in accordance with an embodiment of the invention.
Figure 2:
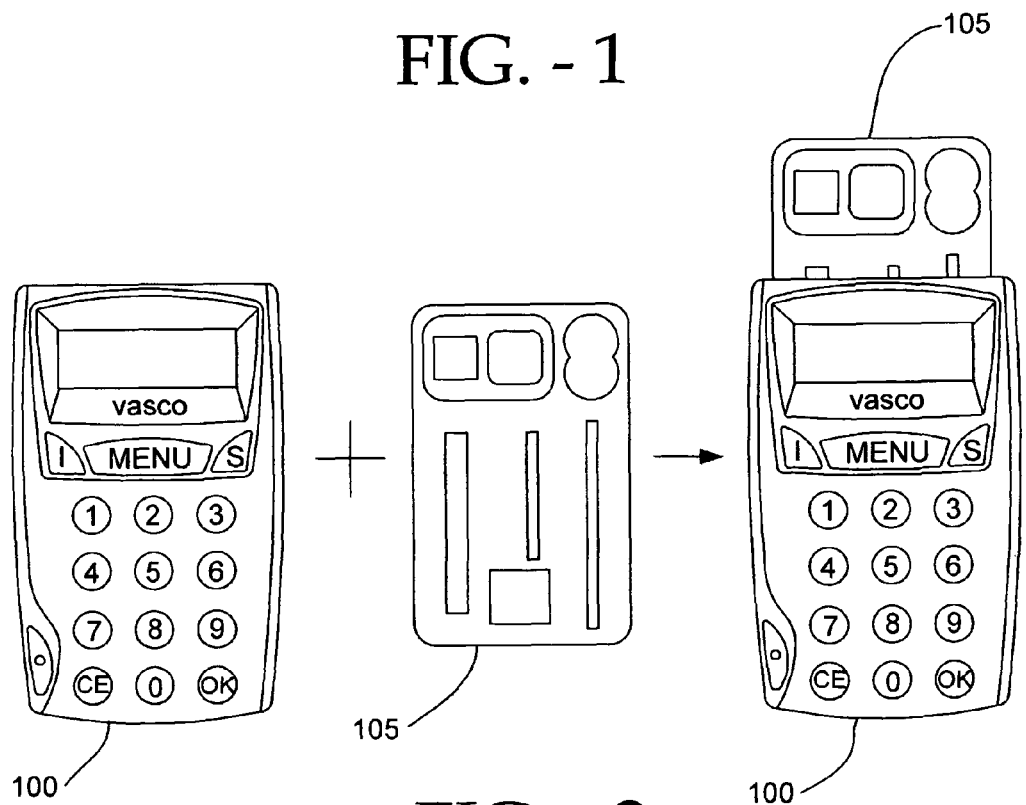
FIG. 2 is an illustration of a smart card and token device in accordance with an embodiment of the invention.

The invention may be considered the first of a new generation of intelligent, unconnected smart card readers or terminals, which offer the strong authentication functionality of a token based on smart card security. Strong authentication itself is traditionally based on a combination of at least two factors present at the same time: something the user has, something they know, and possibly something they are. FIG. 1 shows an example of a smart card terminal in accordance with an embodiment of the invention. As shown therein the smart card terminal 100 includes an ON/OFF switch 101, a keypad 102, a set of function keys 103, a display 107, and a smart card reader 104, adapted to receive and communicate with a smart card 105. FIG. 2 illustrates the operation of the terminal device, in which the smart card 105 may be inserted into, and removed from the terminal 100.

In accordance with an embodiment of the invention, the user may already have a secure smart card and knows the PIN associated with that smart card. When the smart card is inserted into the smart card terminal, it transforms the terminal into an electronic token device via a predefined set of instructions or protocol agreed with and approved beforehand by the smart card issuer or system owner. From then on the terminal (now more correctly considered an electronic token device) can be used for a variety of secure applications. For example, it can be used to log-on remotely to computer networks, to generate one-time passwords, accept challenge messages and calculate responses, and even generate MAC (Message Authentication Code) signatures over messages. As used herein the terms "terminal" and "token device" are used to refer to the same physical device of the invention and to the two instances of that device—one as a smart card reader, and the other as an electronic token device. Any data entry can be performed using an included keypad, while user action is guided using messages on an LCD display. Since it can operated in an unconnected mode the token device can be used on any platform (a personal computer, phone, Internet, kiosk, etc) at any time, and from any place.

Banks currently have millions of smart cards in the field for combined electronic purse and debit functions. At the same time they use tokens for strong user authentication to grant access to their phone, home or Internet banking channel. Both of these systems require an identical process of personalization of the card or token, shipment, PIN mailers, a host system and a helpdesk. The invention now removes this logistical burden and focuses on the smart cards already delivered to the bank customers. Terminal/token devices created in accordance with the invention may be manufactured according to the "factory-to-field" concept. In this sense they may all be identical even up to delivery to the bank agency. There is thus no need to personalize the terminal before it is actually handed over or shipped to the customer. At that point the customer initializes the terminal, transforming it into a token device, by inserting their own personal smart card. The token device derives all required keys according to the rules set up by the card issuer and embedded directly in the unalterable processor mask of the terminal unit. If the card is removed from the token device, all secrets are immediately erased, and the device reverts back to being a regular smart card terminal (i.e. it no longer acts as a token).

Figure 3:
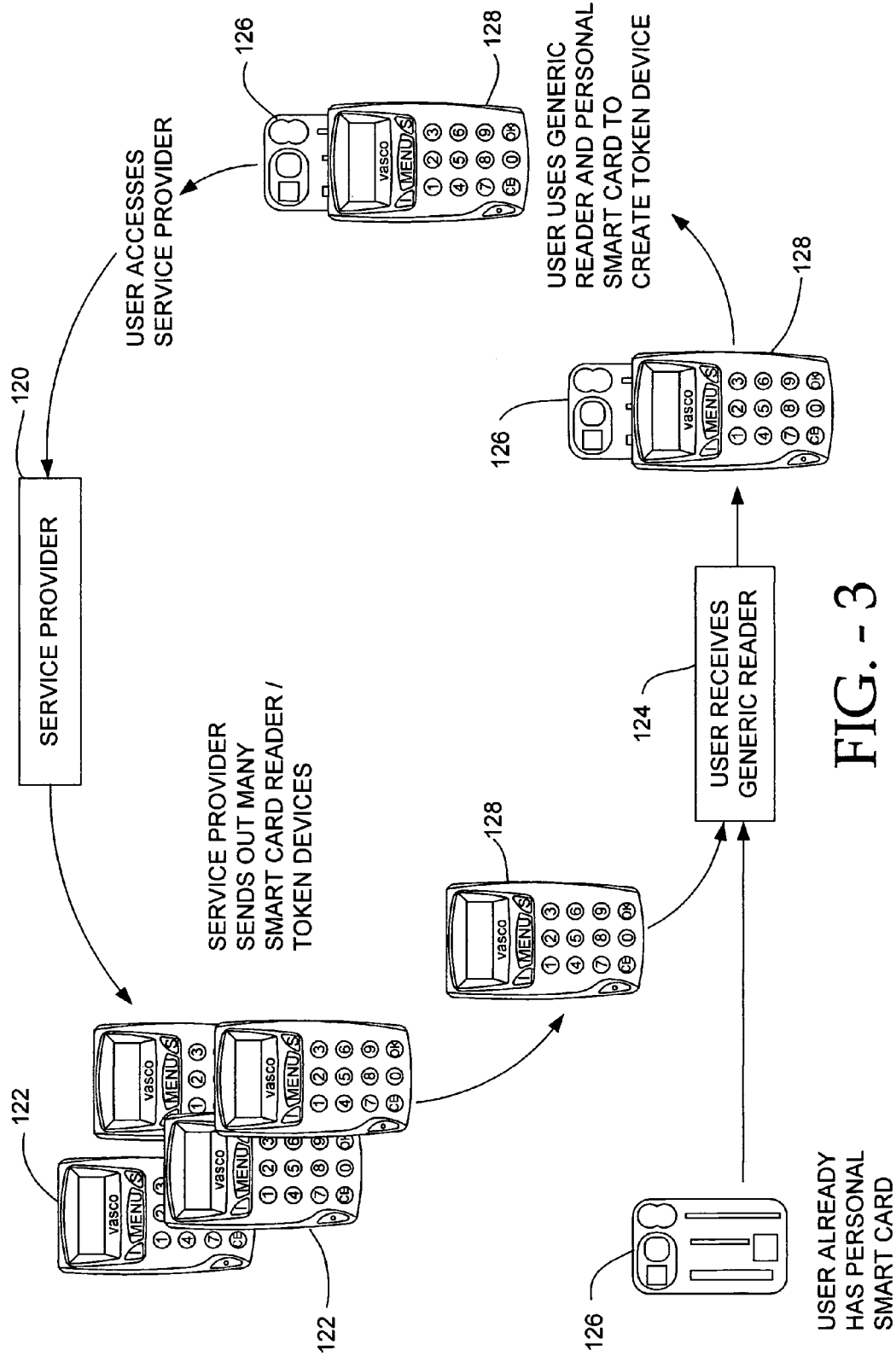
FIG. 3 is an illustration of a token device deployment process in accordance with an embodiment of the invention.

FIG. 3 illustrates schematically the process in which the smart card and terminal are used by a user to access a service provider, such as a bank or other financial institution. A service provider 120 distributes a wide number of low-cost smart card terminals to the public, or at least to a large subset of the population who may be interested in using the services of the service provider. A particular user 124 receives one of the smart card terminal, and inserts their own personal smart card 126 into the terminal to create a personalized electronic token 126/128. This token is then used to access the service providers network, or services.

Figure 4:
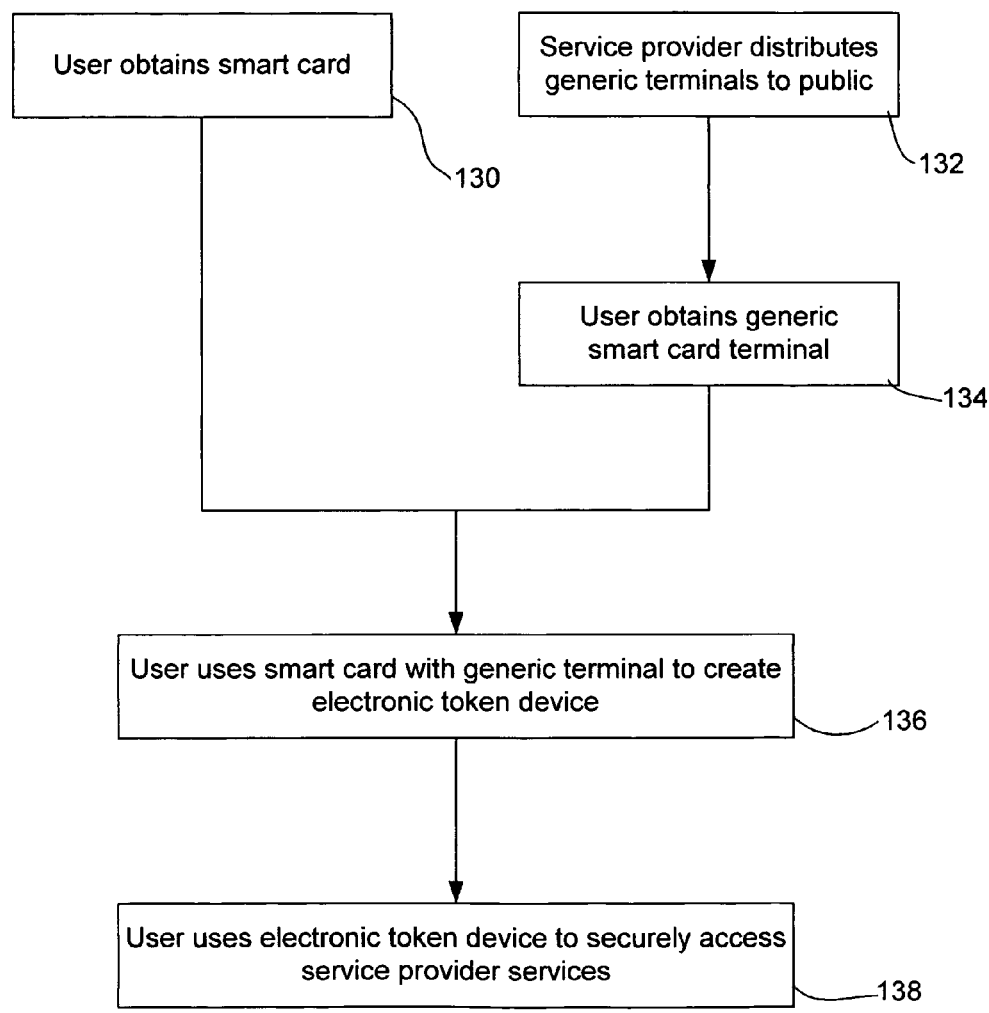
FIG. 4 is a flowchart of a token device deployment process in accordance with an embodiment of the invention.

The steps required to accomplish this process are shown in FIG. 4. As shown therein a user obtains a smart card (step 130) while a service provider distributes generic terminals to the public (step 132). The user obtains one of these generic terminals (step 134) and uses it together with his/her smart card to create the token device, and to generate an electronic token (step 136). This token is then used to access the services provided by the service provider, either locally (in unconnected mode with the application stored on the smart card terminal itself), or remotely, via an intermediate client computer and host server (step 138).

In the general networking world, public key infrastructure (PKI) encryption solutions are becoming more common but they require a more expensive, connected smart card reader with all related problems of drivers and connections. But the connection of the reader is not always possible and even not required for just granting remote access to users. Still they have a huge investment in smart cards that has to be re-used. With the invention, the smart card may be used for the first time at all network entry points. The innovative terminal device replaces the tokens that have to provide secure remote access to Internet, phone banking and other banking services. The terminal provided by the invention can be used in combination with existing smart card schemes—the combination of both becomes unique without requiring the troublesome personalization of the tokens by the service provider.

The invention creates a win-win situation for the service providers such as banks, their customers, and to network owners who have already invested in smart cards. The banks win because the inventions terminal unit allows their customers to use their smart card for almost every contact with their bank. They also get a reasonably priced smart card reader that can be delivered in volume and that needs no specific programming. The cardholder wins because his smart card becomes his standard interface with his bank. At the same time he has an integrated balance reader at his disposal, and in the unfortunate case that his terminal/token device stops functioning, he can just walk to the bank and get a replacement unit without having to wait for a newly programmed one with a new PIN to be delivered. The network owner, who already invested in smart cards and even smart card readers, can now offer a solution to his user who are either unconnected or need secure remote network access.

The biggest advantage of the invention is the fact that smart cards and tokens are no longer considered rival products when it comes to promoting their advantages. From now on they can live in a symbiotic way profiting from the intrinsic security of the smart card combined with the advantage of unconnected tokens. These two key elements permit secure network access from anywhere, anyhow and at anytime, without being limited in access methods and platforms. This allows network operators to address the widest possible users group without any discrimination. The security is also fully in the hands of the issuer as no security parameters and/or key programming and distribution is needed. Every secret that is used is either predefined in the card or derived from parts of that smart card in a secure and unalterable way.

Modes of Operation

In accordance with an embodiment of the invention, the token device may operate in any of three different phases: an initial programming phase, an operational phase, and a battery fail phase.

In the initial programming phase, the token device is shipped to the system owner. As shipped, it contains all required parameters for the system owner in a built-in read only memory (ROM). When batteries are inserted, the token is reset and asks for the smart card to be installed during a 10-second boot up period. When the unit is reset at any later time, it will again ask for a smart card to start the initialization. This phase can also be repeated by removing the batteries from an operational token device.

Figure 5:
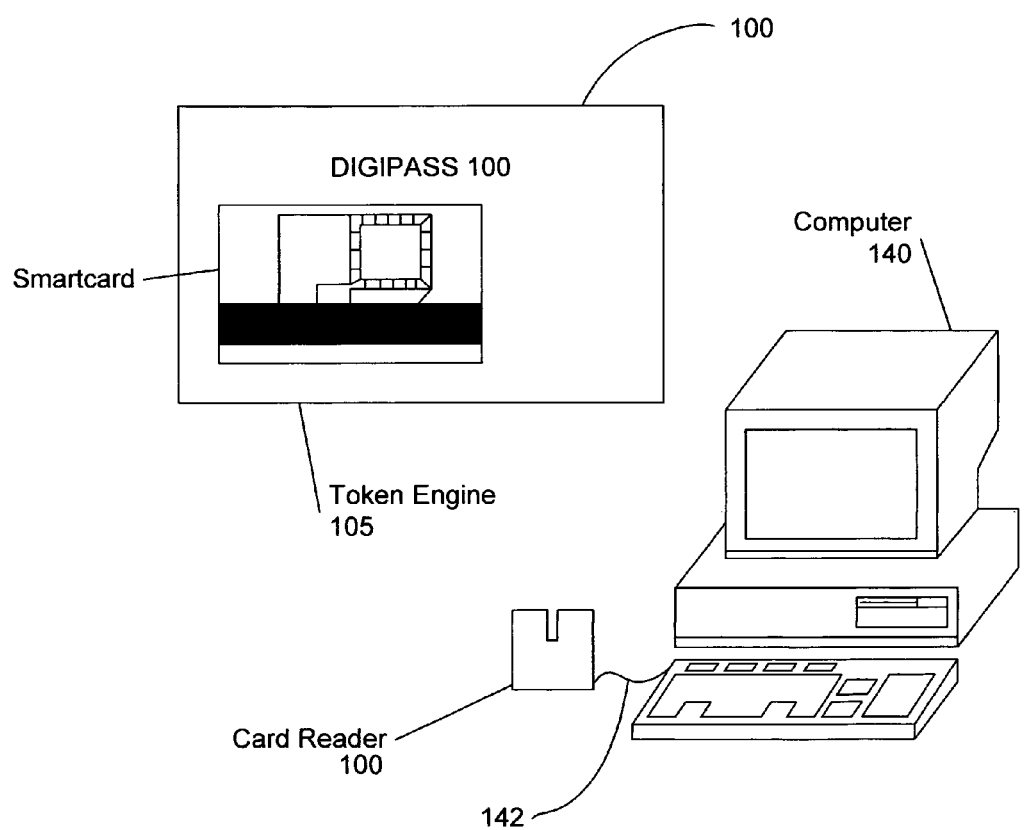
FIG. 5 is an illustration of a token device connected to a personal computer in accordance with an embodiment of the invention.

In the operational phase the token device can be used in either a connected or unconnected mode; and whether it has a smart card inserted into its reader or not. Depending on these parameters the behavior of the token device will automatically change from one of dumb smart card reader to electronic token device, and from an unconnected electronic wallet, to a connected client. In one embodiment the token device becomes fully operational once a smart card is introduced for the first time and a pre-defined initialization phase is successfully executed. In unconnected mode the token device supports time and/or event-based dynamic passwords, challenge/response, and signatures, and acts as an electronic token or electronic wallet in it's own right. In unconnected mode, the dynamic client credential is communicated to the user, allowing the user to submit the credential at the user's initiative to the selected service provider via the platform or communication medium of the user's choice to implement the strong authentication. These different modes are described in further detail below. In connected mode, as illustrated in FIG. 5, a token generating application runs on the user's personal computer (PC) 140 while the token device (the combination of smart card terminal 100 and smart card 108) acts as a slave device, connected to the PC by a serial or equivalent connection 142. Depending on the complexity, certain firewall-like filters can be installed into the token device or the token application that may be used to accept certain addresses in the card, or specify certain field length, sequence of operations, specific commands, etc.

When the voltage level drops under a predefined level, the token device enters a battery fail phase, and signals a "battery low" warning. The battery must then be replaced in order to keep the RAM contents intact.

Customer Use

As any prospective banking, financial, or equivalent organization will wish to distribute the smart card terminal/token device at the lowest possible cost to their customers, it is important that as many people as possible can use that one token. A modern household may have a variety of different cards—perhaps one or two for each person in the household. Hence the token device is designed such that many members of a family can use it, while the smart card activates each users own personal secrets. It will be evident that the invention is not limited to home applications but instead that it's features, and particularly it's ability to offer a group of people a common security interface, makes the invention useful in many commercial or industrial settings.

Other than the original electronic wallet applications, space may be reserved in the token device for future terminal applications such as electronic ticket reservation, user authentication, secure access control, etc. Each of these terminal applications needs different attention and may utilize different ways of handling the secrets. One embodiment of the present invention may be implemented by presetting the number of terminal applications per user (4, for example). In the 4-limit terminal application embodiment, a token device may have up to 16 terminal applications which can be defined as coexisting beside each other. If so required, these 16 terminal applications can also be used by a single user, or alternatively two individual users may use up to 8 terminal applications. Any alternative combination of users and terminal applications may be implemented.

In one embodiment, messages are defined to guide the user through the use of each application. Messages may be limited to save resources. For example, in one embodiment a total of 64 messages may be programmed over all 16 applications. These messages remain in one block of memory. The messages may be stored in ROM and shared across applications, or may be stored in the applications themselves. Alternatively, additional resources may be provided for more extensive messaging. The messages can be updated as a full block by use of a program smart card.

In one embodiment, the original software used with the smart card is already factory programmed during manufacturing into a programmable Read Only Memory (ROM) area of the token device. When the token device receives a hardware reset, this initial program is copied from ROM storage to the first partition in the RAM Memory and executed.

In accordance with one embodiment of the invention the token device is upgradeable. However, as new applications arrive, not everybody may want to subscribe. Therefore, in one embodiment, the token device includes a memory management system that is block-based and that can be managed from an upgrade smart card. The block size is defined in such a way that the memory is used in an optimal fashion. For example, certain applications may use several memory blocks. The token device operating system will automatically put the new application into the available position. If insufficient memory space is available for this process then the user will be warned on the display. A new application or an upgrade can be set to delete a previous version. The upgrade smart card should in this case contain the file header, the version number and the instruction to delete a previous version if found.

On-line upgrades are mainly directed toward connected applications for the token device and fall within the responsibility of the application or system owner i.e., the bank, financial institution, or other organization which has developed the application. In one embodiment, for security purposes, an on-line upgrade can only be used to upgrade only those token applications residing on the PC, and not the applications residing in the memory of the token device.

Figure 7:
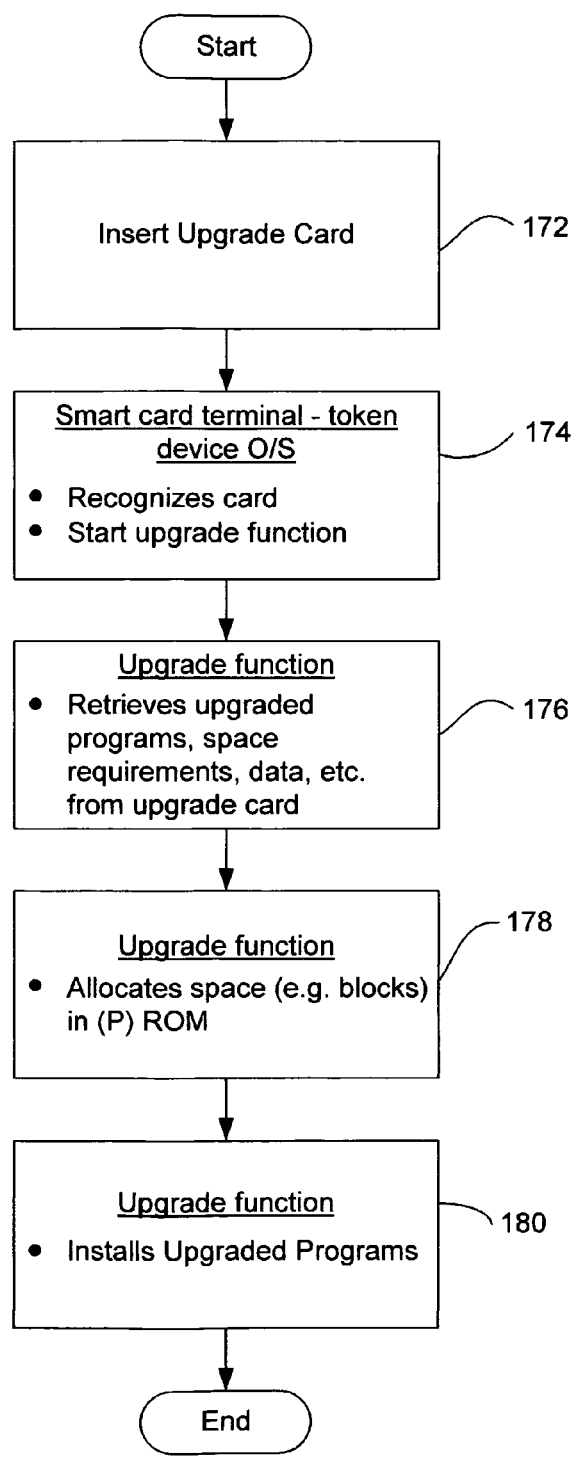
FIG. 7 is a flowchart of a token device upgrade process in accordance with an embodiment of the invention.

Token device applications can be also upgraded or expanded off-line by using a program smart card. In one embodiment, this card needs a specific operator personal identification number (PIN) and is not intended for distribution to the end-user. To guarantee the authenticity of the token device and of the upgrade smart card, an initial mutual challenge/response mechanism can be used, or if available a "certified read" mechanism can be used to authenticate both devices. Users wanting to upgrade or subscribe to a new service may also visit a service point of the system owner with their token device. FIG. 7 shows a flowchart of one such upgrade process in accordance with the invention. The upgrade card is inserted into the reader (step 172). The reader hardware recognizes the upgrade card and starts an upgrade function (step 174). Upgrade data, programs etc. are loaded from the upgrade card into the memory of the smart card reader/token device (step 176), and stored in an appropriate ROM memory block (step 178). Upgraded applications are then accessible by the user (step 180).

External Device Characteristics

In one embodiment the housing for the token device has a portrait design for easy handheld use. The length and width is approximately the same as a standard credit card. The thickness largely depends on the thickness of an optional Universal Serial Bus (USB) connector used to connect the smart card terminal or token device to a user's personal computer. Other housing types and shapes may be utilized while remaining within the spirit and scope of the invention. The token device may utilize any convenient electronic packaging for independent use and/or may be integrated into other standard electronic devices, for example a cell phone, or personal digital assistant (PDA) etc. The different elements of the token device can be divided into 3 interface levels: the interface with the user, the interface with external devices such as a connected PC, and the interface with the smart card.

User Interface

In one embodiment of the smart card terminal/token device, the user interface has two elements—a display, and a keypad. The display may be a liquid crystal display (LCD) type although other display types and designs may also be substituted (for example a backlight display, LED display, etc.). The physical size of the display can be maximized with respect to the overall size of the token device, and special measures may be taken so that the glass is protected against breaking. The display should be easily legible for a user that sits in front of it, and can include a tilted or hinged display to facilitate viewing.

The keypad may be fabricated of a rubber or rubber-like flexible mat offering a good travel of the keys and tactile feedback. Other technologies can be considered. The functions of the keys should support the normal token device functions. Because most of these token devices may be used in non-professional (i.e. in the home, or on the road) environments the keys should be sufficiently large to allow easy handling. The design may take into account, where possible, that there are certain design considerations for physically handicapped people, like the size and type of keypad letters. All keys have their denomination imprinted in ink. The ink may be of a permanent type to prevent easy wipe out of the imprint. Alternatively, impressions may also be utilized (impression lettering, symbols, Braille, etc.). The function keys can have different colors. Smart grouping can limit the number of colors to reduce manufacturer costs. The ON/OFF key should be protected against an accidental, continuous ON state during transport. This helps to prevent unnecessary battery drain. The "5" key may have a reference mark for visually disabled people.

External Interface

A universal serial bus (USB) connection is optionally available for interface with a personal computer (PC). Alternatively, any of infra-red (IR), parallel, serial, or other connections may be implemented. The connector can be integrated into the token device housing. To support Plug & Play, in one embodiment, the port address and interrupt settings are automatically set by the PC. If the USB port of the PC is used, the token device will use the power coming from the USB bus. If required, power regulation circuits can be provided. If volume users (larger banks, etc.) consider the USB connection is not necessary for their particular application, then it may be left out.

Internal Device Characteristics

Figure 6:
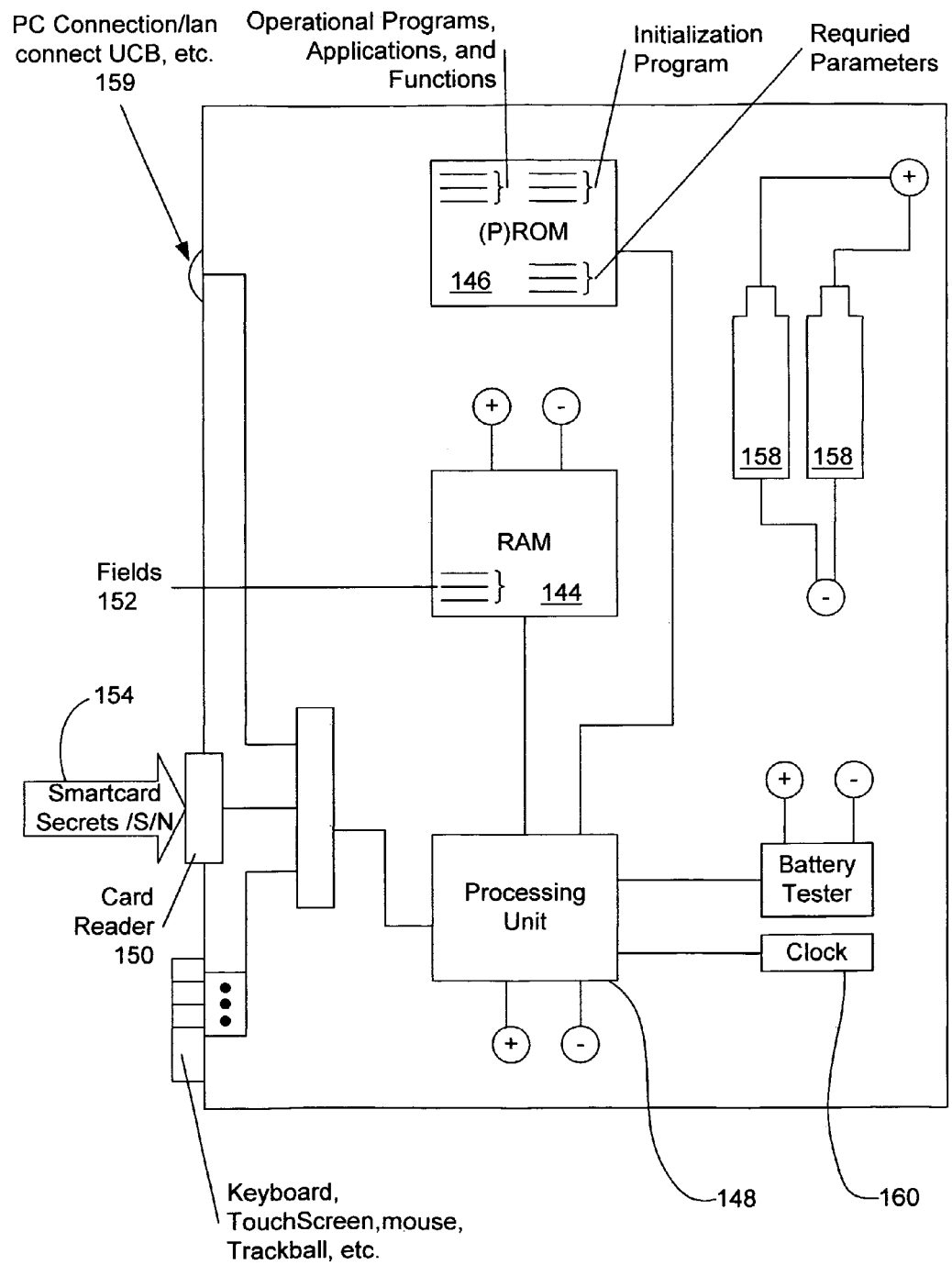
FIG. 6 is a schematic layout of a token device in accordance with an embodiment of the invention.

FIG. 6 illustrates schematically one embodiment of the smart card terminal and reader in accordance with the invention. An embodiment of the token device comprises a smart card reader 150 which has a slot to insert a standard smart card 154. Other smart card designs, shapes, etc. may be accommodated in alternate embodiments, while remaining within the spirit and scope of the invention. For maximum compatibility with current standards the smart card reader must accept full sized cards that conform to the International Standards Organization (ISO) 7810 specification. Ergonomically, positioning of the smart card reader follows 2 main criteria: it should be suitable for both left and right handed people; and it should not allow access at the top because the card opening will work as a dust aspirator and the accumulated dust will eventually cover the contacts, block the end-of-travel switch or de-align the contacts with the card.

Access from the front is one possible design solution since it allows the USB connection 159 to sit at the back pointing towards the PC. Arranging the connections in this way is automatically compatible with left or right handed people. Alternative positioning may also be utilized. The use of landing contacts is preferred to scraping contracts, as the landing contacts do not damage the gold plated contacts on the smart card. However, other contacts may be utilized. An end-of-travel switch continuously monitors the presence of the smart card in those applications or phases pre-set to work with the smart card. When using these types of applications a removal of the smart card halts the ongoing application immediately.

For proper operations with a PC, a suitable software driver must be delivered either to the bank or individually with each distributed token device. Drivers may be currently provided for Windows, unix, OS/2, and NT systems. Other drivers may be provided as needed. Specialized applications and drivers may be stored in a combination of ROM 146 and RAM 144 memory, and accessed via a central processing unit 148. The central processing unit also monitors user input from a keyboard or touchscreen device 156.

The token device can interoperate with other special cards. Once in connected mode the token device can be designed to work with Java cards, and with Smart cards with cryptographic co-processor such as RSA cards.

In most instances it is preferred that the smart card should be well insertable into the token device to at least 75% of its overall size. Taking out the card is and easy push out or pull-out process. The card reader includes an end-of-travel switch to detect the correct insertion of the card, and to display the status of such on the display or as a computer application icon.

An internal clock 160 is required for token device time-dependent application such as time-based passwords, time based signatures etc. The internal clock is powered by an internal battery. The clock is internally set to Greenwich mean time (GMT) time during production.

The token device may be allowed to work in connected or non-connected mode. In the connected mode it gets its power from the USB port. In non-connected mode the token device works by getting power from the internal batteries 158. To allow exchange of the batteries without loss of memory, in one embodiment 2 independent batteries, each of 3 Volts, can be used. Typically, the batteries will already be in place at the moment of delivery to the user. In one embodiment, a plastic temporary insulation strip, accessible from the outside, can be removed after which the contacts close and the batteries becomes operational. This keeps the batteries in the best condition. In this embodiment, a couple of issues have to be carefully considered: the token device should be tested before the plastic is put in place; and, a scheme should be defined to set the clock to the correct GMT time. The battery status can be visualized through a menu item, and is some embodiments may be replaceable. A typical lifetime of the token device is at least 3 years.

Secure Applications

The secure applications of the token device are designed to be compatible with legacy systems and legacy tokens. This means that token device can handle:

time or event based dynamic passwords fast and slow time changes challenge/response basic signatures extended signatures, even if concatenated In some embodiments the token device supports Data Encryption Standard (DES) and triple DES. In some embodiments, the token device also supports the PKA mechanism to unlock a secret that resides in encrypted mode on a PC. The exchange of the dynamic key between PC and token device can be automated if the two are linked via the USB. The token device may allow customers, using a smart card containing private keys and digital certificates on the smart card, to transfer these keys and certificates to the application in the PC. The fact that a PIN can be requested to open the token device and/or the smart card provides a double security mechanism.

Balance reader functions are functions that are accessible in a smart card, which don't require large applications. Typically, they show the balance of the amount in the electronic wallet; show the last five transactions; and control the locking and unlocking the electronic wallet. In some embodiments these functions are accessed by 1 or 2 direct access keys on the keypad. If this is not desired then they should be part of a user-accessible menu. One feature of the present invention as implemented in the electronic wallet variant provides for showing the current balance and the last five transactions, which displays in one continuous flow with a display pause of 3 seconds before going to the next entry.

A balance feature shows the current balance in the electronic wallet. As the token device is designed to be marketed worldwide, the currency may be shown behind the total. The information to derive which currency is used, can be found in the international currency value that is stored in the smart card. To reduce the incorporated translation database in the token device this value can be either prefixed during production or else the database can be limited to one country and eventually some important surrounding currencies. The last five transactions may be shown (credit as well as debit with the corresponding "+" (load) or "−" (payment) sign). The date of the transaction may also be shown. The order will typically be most recent transaction first. Partial transactions (such as telephone calls) will be shown as a single transaction. Once the last transaction is shown, the token device will halt showing information from the card. Alternate embodiments provide for any number of last transactions.

In one embodiment, a locking feature of the wallet is provided. A special icon on the display may show an open or closed lock depending on the state of the electronic wallet. Locking and unlocking will require a PIN entry for the smart card and may require writing to the smart card.

In one embodiment for use in Europe primarily, the token device includes a feature that is able to convert the Euro's form of currency to the old local (i.e. country-specific) currency. Access to this conversion feature is either through a menu item or through direct access via a dedicated key. The corresponding conversion factor is preferably programmable by the user. In that way users outside the Euro community can use it to convert to a desired local currency while traveling abroad. Alternatively, a table of conversion rates may be maintained in the token device. The table may be updated from an update card or connection to a web page having an updated table. In another alternative, the conversion factor can be programmed in ROM during the production process.

Device Security

The token device includes a variety of PIN management features. As the token device can be used as a standalone token device even without the smart card inserted, embodiments of the invention allow the token device to be secured with a PIN. In one example, a different PIN can be set for each of the maximum 4 users. The PIN length may be set between 2 and 8 digits. A factory default PIN can be set and a new PIN can be forced at initialization. As the token device is used together with a smart card, which in turn is also PIN protected, users may be tempted to use the same PIN for both. In one embodiment, in order to prevent that the PIN is retrieved by hacking the token device, the token device PINs are not saved in the memory of the token device.

An unlock code for each of the 4 per-card supported users is provided. Unlocking is possible only in those cases where the PIN of the token device is used and where the PIN is not handled by the smart card. In such cases the smart card may lock itself and the unlocking sequence will need to be followed as specified by the system owner.

The token device may contain a number of secrets, counters and initial vectors. In one embodiment of a typical token device, it may for example contain per user:
  4 secrets keys of 64 or 128 bit
  1 unlock key valid for each of the users
  a signature of the PIN In one embodiment, the token device includes a true random generator that can be used to personalize the token device based on an historical secret. A smart card terminal/token device that is handed over to a customer cannot be used until it is personalized, i.e. it is converted from a regular smart card terminal or reader into an electronic smart card token. Personalization starts when a smart card is inserted. Depending on the wishes of the card organization the security level employed by the token device can vary from a "medium" to a "very high" level of security.

Medium Security Mode

Figure 8:
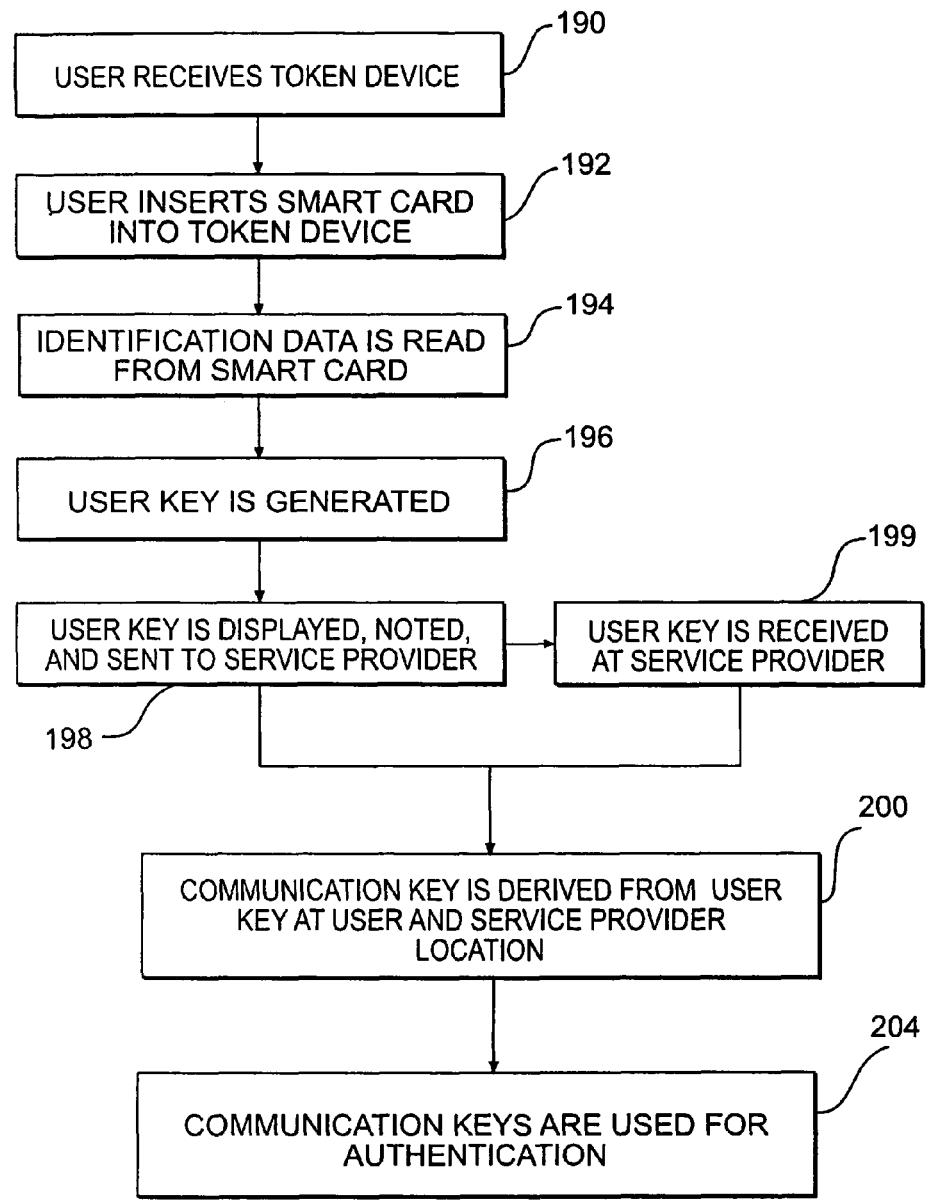
FIG. 8 is a flowchart of a token device medium security process in accordance with an embodiment of the invention.

A flowchart showing the operation of the medium security mode is shown in FIG. 8. The user obtains a generic smart card reader/token device (step 190) and their own personal smart card. The smart card is then inserted into the smart card reader (step 192) where the data can be read (step 194). In this security mode the token device random generator generates a one time "historical" secret. A user key is then generated and is displayed (step 196). The user notes down this value (step 198) and stores it for these cases where he/she gets a new token device or has to re-initialize the token device. In this way, the new token device will restore the secrets as they originally were in the initial token device without requiring any intervention in the server. The user also sends this value to the card organization or service provider. The card organization (for example, a bank) must introduce this value into their database and do the correct calculation with the secret key to derive at their end the derived key that the token device will use when it actually authenticates (step 200). The derived keys may be compared to ensure user authentication (step 204). As there is a slight risk of exposure of the historical value, the security level is regarded as medium although any potential hacker would need to intercept this information during this single window in time and would also need the secret key in the card to be able to crack the system.

High Security Mode

Figure 9:
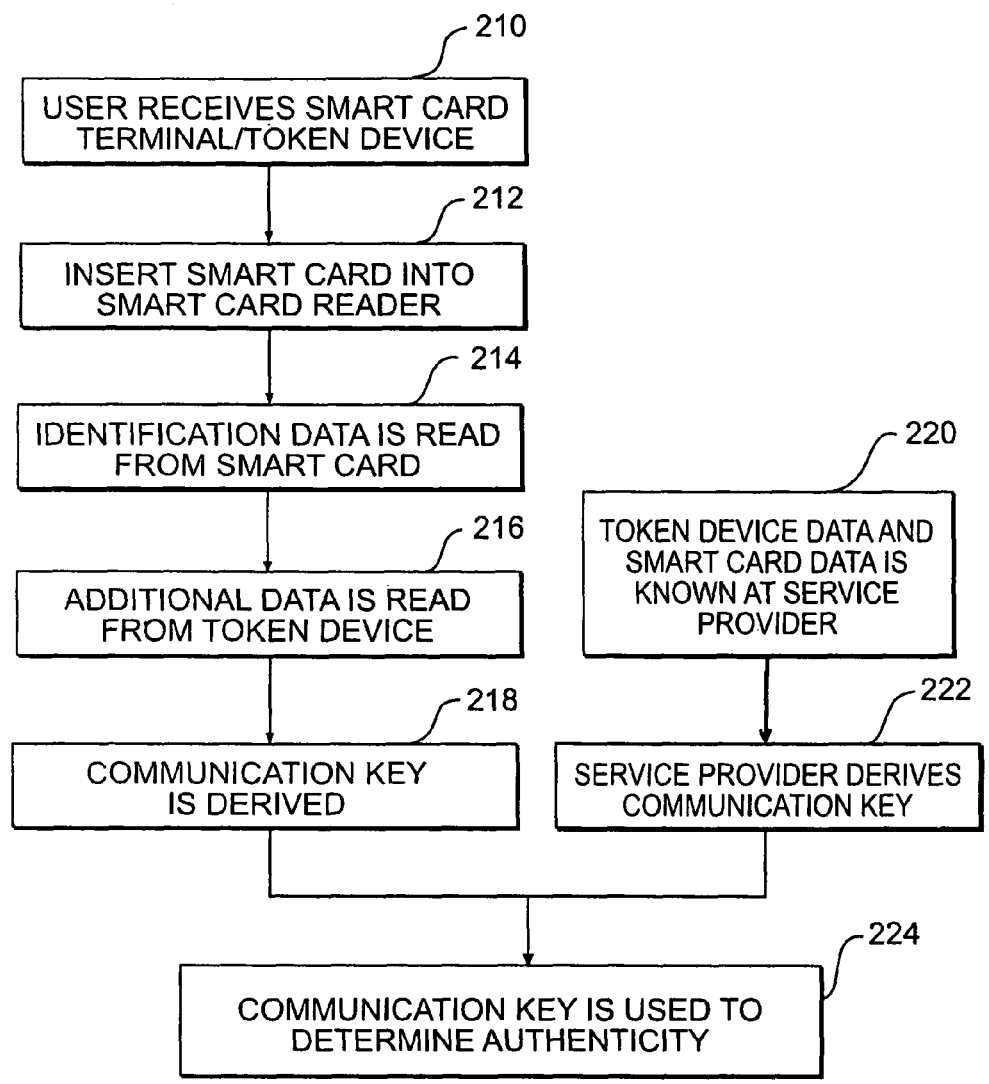
FIG. 9 is a flowchart of a token device medium-high security process in accordance with an embodiment of the invention.

A flowchart showing the operation of the high security mode is shown in FIG. 9. Again, the user must first obtain a generic smart card reader/terminal device (step 210), smart card and insert the smart card into the reader (step 212). In this security mode, the smart card is given a certain value (for example a serial number, an account number, a fixed or predefined value in the token device) as an input (step 216). This value is then used as input in the DES engine of the smart card together with one of the smart card secrets (address to be defined by the card operator) to derive a new value step 218 that will be stored in the RAM memory of the token device. From then on the token device will use this secret in the calculations. If if these values are values known by the service provider (step 220), they can derive the same token device key and store that in his database (step 222) to authenticate a user or transaction (step 224). This work can be done automatically.

Very High Security Mode

Figure 10:
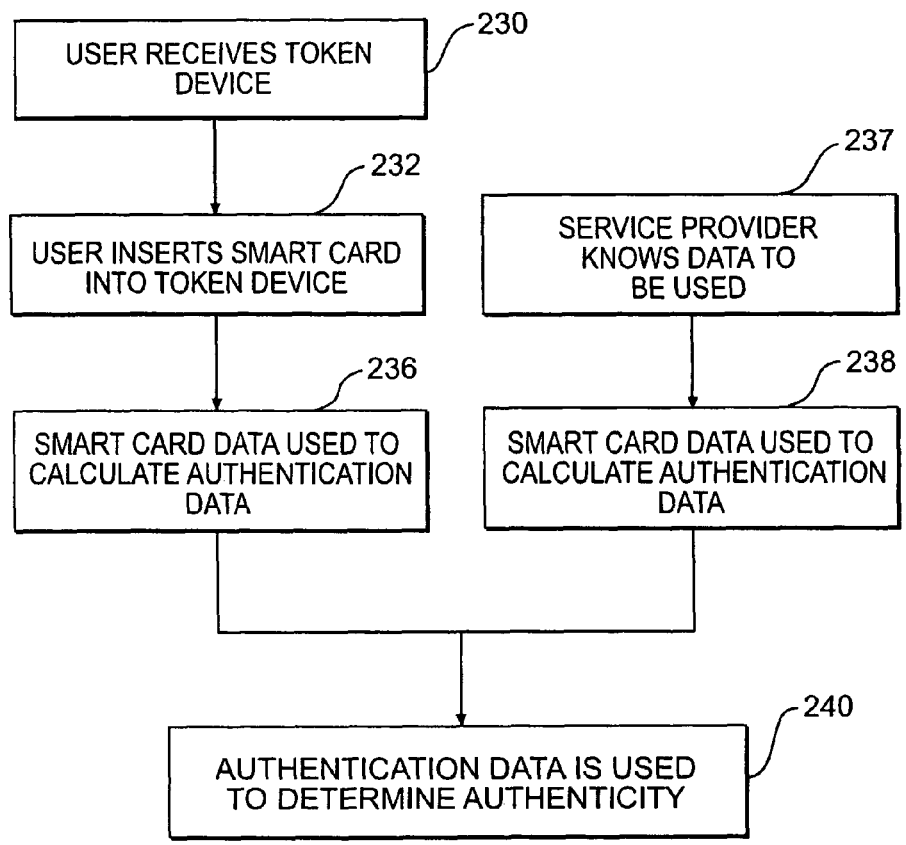
FIG. 10 is a flowchart of a token device high security process in accordance with an embodiment of the invention.

A flowchart showing the operation of the very high security mode is shown in FIG. 10. Again, the user must first obtain a generic smart card reader/terminal device (step 230), smart card and insert the smart card into the reader (step 232). In this mode or security level, the token device uses the smart cards cryptographic calculation capabilities with the secrets remaining embedded in the smart card all of the time (step 236). As these keys have to remain in the card, the smart card will have to do all the calculations. The card organization, system owner, or service provider can define which fields can be addressed and with what restrictions (on length, numeric, etc.). In this way the token device can work as a firewall, since the smart card can only be accessed via documented commands. The keys in the card can not be compromised and no other external keys are used. In fact the token device is initialized each time the smart card is introduced and the user can do a transaction on any token device issued by the smart card operator. As the service provider knows (step 237) which secret a customer's card will use, no extra work is required in the authentication center. The customer or transaction can then be authenticated (step 240).

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, microdrive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, retrieving user secrets from a smart card reader, automatically performing functions, setting security levels, managing electronic wallet accounts, managing different users, generating encrypted communications, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

For some customers, other embodiments of the invention provide for a token engine and technology integrated into a CPU on a smart card. This chip is then readable in existing smart card readers and uses the readers keyboard and display in combination to form a token device in accordance with the invention. There may be different types of token devices: token only, integrated with other smart cards, integrated with memory cards for cellular phones etc.

INDUSTRIAL APPLICABILITY

Any sector wanting to introduce strong authentication for network access based on smart cards can use the invention. The main trigger to use these smart cards is that there should be a sufficiently high issuance of smart cards or an important installed park of smart cards. Even if these cards were not originally designed for this application, the invention allows the use of embedded strings or secrets on the card to initialize itself in a unique way without compromising the security of the existing applications. Typical markets are primarily the banks having millions of smart cards issued or companies involved in smart card applications such as PKI security.

The advantage of the system is that with the invention there is no real need for a connected smart card reader. In an unconnected way the token device can be used on any platform (PC, Mac, phone, Internet, kiosk, etc) at any time and from any place simply because it works in an unconnected way. This lowers dramatically the reluctance level of users. But what is more important that it most certainly lowers the cost of ownership to the card issuers as the helpdesk is not overloaded with calls for new software drivers, other types of cables and from confused users not knowing how to connect the reader.

What is claimed is:

1. A handheld electronic smart card terminal capable of acting as a token device for allowing secure communication between a user and a remote application provided by a service provider, said handheld terminal comprising:
    a smart card reader adapted to receive and communicate with a smart card having data stored thereon;
    a processor including a firewall to protect said smart card and configured to implement a token personality logic that is initially generic and to personalize the token personality logic with a token device personality subsequent to insertion of said smart card in said smart card reader, said token device personality dependent on said stored data;
    a display for communicating a dynamic credential derived from said token device personality to said user for transmission to said remote application provided by a service provider;
    a memory device storing at least one terminal application capable of being loaded and executed by said processor; and
    an interface configured to transmit secured data from said terminal to a connected device, wherein said at least one terminal application includes a connected mode application that configures said token device in a connected mode such that said token device acts as a slave to a computer connected to said interface.

2. The terminal of claim 1 wherein said processor is further configured to erase said token device personality when the smart card is removed from the smart card reader.

3. The terminal of claim 1 further comprising a unique terminal identifier associated with said smart card terminal.

4. The terminal of claim 3 wherein, with a smart card received by said smart card reader, said token personality logic implemented by said processor generates said token device personality using a combination of said data and said terminal identifier.

5. The terminal of claim 1 wherein said processor is further configured to copy said data from said smart card to said smart card terminal.

6. The terminal of claim 5 wherein said processor is further configured to erase said data from the smart card terminal when the smart card is removed from the smart card reader.

7. The terminal of claim 1, 'wherein said at least one terminal application is configured to accept a Personal Identification Number (PIN) from one of a set of terminal users, and provide access to other functions and/or applications of said terminal only to a user associated with the accepted PIN.

8. The terminal of claim 1, wherein said at least one terminal application supports security paradigms, including at least one of time, event, event or counter based passwords, challenge response, and signatures.

9. The terminal of claim 1, further comprising a clock connected to said processor and utilized by the terminal or any terminal application in performing clock, event, or counter based security paradigms.

10. The terminal of claim 1 wherein said display communicates said dynamic credential in response to data input by said user.

11. The terminal of claim 1, further comprising an interface connected to the processor, the processor further configured to transmit data from said terminal to a remotely connected device.

12. The terminal of claim 11, wherein said interface comprises at least one of an infra red device, scanning device, telephone line connection, network connection, and universal serial bus port.

13. The terminal of claim 1, wherein said processor is further configured to process data using at least one of Data Encryption Standard (DES), Triple DES, and other cryptographic processes.

14. A handheld electronic smart card terminal capable of acting as a token device for allowing secure communication between a user and a remote application provided by a service provider, said handheld terminal comprising:
- a smart card reader adapted to receive and communicate with a smart card having data stored thereon;
- an interface transmitting secured data from said terminal to a connected device;
- a processor configured to implement a token personality logic that is initially generic and to personalize the token personality logic with a token device personality subsequent to insertion of said smart card in said smart card reader, said token device personality dependent on said stored data, the processor including a firewall protecting said smart card;
- a display for communicating a dynamic credential derived from said token device personality to said user for transmission to said remote application provided by a service provider; and,
- a memory device storing a least one terminal application capable of being loaded and executed by said processor;
- wherein said at least one application supports an electronic wallet.

15. The terminal of claim 14, wherein the electronic wallet application displays current balances and a predetermined number of last previous transactions of the wallet.

16. A method of accessing a remote secure application, comprising:
receiving a handheld generic smart card terminal, wherein said handheld generic smart card terminal includes:
- a generic token personality logic;
- a smart card reader adapted to receive and communicate with a smart card; and
- a display for communicating token data derived from a token device personality to a user for transmission to said remote secure application;

receiving at said smart card reader said smart card having data stored thereon;
generating the token device personality based on said data stored on the smart card;
deriving the token data from the generated token device personality; and
accessing said remote secure application using said token data derived from said token device personality;
wherein said terminal remains generic until said smart card is received and communicated with by said smart card reader, includes a clock, and said token data derived from said token device personality is also dependent on said clock.

17. The method of claim 16, farther comprising:
erasing said token device personality when the smart card is removed from the smart card reader.

18. The method of claim 16 further comprising associating a unique terminal identifier with each smart card terminal.

19. The method of claim 18 wherein said generating includes:
generating a token device personality using a combination of said stored data and said unique terminal identifier.

20. The method of claim 16 further comprising:
copying said stored data to said smart card terminal.

21. The method of claim 20 further comprising:
erasing said stored data when the smart card is removed from the smart card reader.

22. The method of claim 16 further including:
entering further data into the terminal;
receiving a response to said further data; and,
communicating said response.

23. The method of claim 22 wherein the further data comprises a PIN.

24. The method of claim 22 wherein said entering further data is via a keypad attached to the terminal, and said receiving a response is via a display attached to the terminal.

25. The method of claim 16, wherein said handheld generic smart card terminal further includes an interface, said interface communicating with a client computer.

26. The method of claim 25 wherein said terminal:—
receives further data from a connected client computer,
generates a response to said further data, and
communicates said response to said client computer.

27. A method of providing a user, among a plurality of users, with secure access to a remote application of a service provider, comprising:
distributing to said plural users a different one of a plurality of generic handheld smart card terminals, wherein each of said generic handheld smart card terminals includes:
- a generic token personality logic;
- a smart card reader adapted to receive and communicate with a smart card;
- a display for communicating token data derived from a token device personality for said service provider remote application; and
- an interface, said interface for communicating with a client computer;

a processor providing a firewall to protect said smart card;
wherein any of said generic smart card terminals, in use, perform the following steps:
receiving said smart card in said smart card reader, said smart card having data stored thereon;
following said receiving at said smart card reader said smart card generating said token device personality using said stored data;
deriving the token data from the generated token device personality; and
assisting said user in accessing said secure remote application provided by said service provider by providing said token data derived from said token device personality to said user for said secure remote application;
wherein said terminal remains generic until said smart card is received and has communicated with said smart card reader and wherein said token data derived from said token device personality comprises a one-time password.

28. The method of claim 27, further comprising:
erasing said token device personality when the smart card is removed from the smart card reader.

29. The method of claim 28 further comprising:
associating a unique terminal identifier with each smart card terminal.

30. The method of claim 29 wherein said generating includes:
generating said token device personality using a combination of said stored data and said unique terminal identifier.

31. The method of claim 27 further comprising:
copying said stored data from said smart card to said smart card terminal.

32. The method of claim 27 further comprising:
erasing said token data when the smart card is removed from the smart card reader.

33. An electronic smart card terminal as recited in claim 1 which further includes an internal battery supply.

34. An electronic smart card terminal as recited in claim 33 wherein said battery supply includes at least one user replaceable battery.

35. An electronic smart card terminal as recited in claim 33 which further includes a battery status indicator.

36. An electronic smart card terminal as recited in claim 33 wherein said terminal includes a clock.

37. A method as recited in claim 16 wherein said smart card is a bank card.

38. A method as recited in claim 16 wherein generating said token device personality includes:
reading a data element from the stored data on said smart card, and
deriving a secret from said data element.

39. A method as recited in claim 38 wherein said secret comprises a cryptographic key.

40. A method as recited in claim 16 wherein said accessing includes authenticating said user.

41. A method as recited in claim 16 wherein said terminal performs as a strong authentication token.

42. A method as recited in claim 16 wherein said token data derived from said token device personality comprises a one-time password.

43. A method as recited in claim 16 wherein said token data derived from said token device personality comprises a message authentication code.

44. A method as recited in claim 16 wherein said token data derived from said token device personality comprises a digital signature.

45. A method as recited in claim 27 wherein said smart card is a bank card.

46. A method as recited in claim 27 wherein generating said token device personality includes:
receiving a data element from said smart card, and
deriving a secret from said data element.

47. A method as recited in claim 46 wherein said secret comprises a cryptographic key.

48. A method as recited in claim 27 wherein said assisting includes authenticating said user.

49. A method as recited in claim 27 wherein said terminal operates as a strong authentication token.

50. A method as recited in claim 27 wherein said token data derived from said token device personality comprises a message authentication code.

51. A method as recited in claim 27 wherein said token data derived from said token device personality comprises a digital signature.

52. A method of accessing a secure remote application of a service provider, comprising:
receiving a handheld generic smart card terminal, wherein said handheld generic smart card terminal includes:
a smart card reader adapted to receive and communicate with a smart card;
a display for communicating data useful in accessing said secure remote application to a user of said handheld smart card terminal; and
a clock;
receiving said smart card;
inserting said smart card into said smart card reader;
following said inserting, generating said data useful in accessing said remote application by initiating operations within said smart card and obtaining smart card data by the terminal from the smart card, said generated data being also dependent on said clock; and
accessing said secure remote application using said generated data.

53. The method of claim 52 wherein said generated data comprises a one-time password.

54. The method of claim 52 wherein said generated data comprises a message authentication code.

55. The method of claim 52 wherein said generated data includes a response to a challenge.

56. The method of claim 52 wherein said smart card is a bank card.

57. The method of claim 52 wherein said smart card terminal includes a battery supply.

58. The method of claim 57 wherein said battery supply includes at least one user replaceable battery.

59. A method of providing a user, among a plurality of users, with secure access to a remote application of a service provider, comprising:
distributing to said plural users a different one of a plurality of generic handheld smart card terminals, wherein each of said generic handheld smart card terminals includes:
a generic token personality logic;
a smart card reader adapted to receive and communicate with a smart card;
a display for communicating token data derived from a token device personality for said service provider remote application;

wherein any of said generic smart card terminals, in use, perform the following steps:
   receiving said smart card in said smart card reader, said smart card having data stored thereon;
   following said receiving at said smart card reader said user smart card:
   generating said token device personality using said stored data;
   deriving the token data from the generated token device personality; and
   assisting said user in accessing said secure remote application provided by said service provider by providing said token data derived from said token device personality to said user for said secure remote application;
wherein said terminal remains generic until said smart card is received and has communicated with said smart card reader and
in which said terminal includes a clock and in which said token data derived from said token device personality is also dependent on said clock.

60. The method of claim 22 wherein said further data comprises a challenge.

61. The method of claim 22 wherein said further data comprises application data to be signed.

62. The method of claim 26 wherein said further data received from said client computer is information from a service provider comprising a challenge.

63. The method of claim 26 wherein said further data received from said client computer is application data to be signed.

64. A method as recited in claim 16 wherein said token data derived from said token device personality comprises a time based one-time password.

65. A method as recited in claim 16 wherein said token data derived from said token device personality comprises a counter based one-time password.

66. A method as recited in claim 27 wherein said token data derived from said token device personality comprises a time based one-time password.

67. A method as recited in claim 27 wherein said token data derived from said token device personality comprises a counter based one-time password.

68. A method of accessing a remote secure application, comprising:
   receiving a handheld generic smart card terminal, wherein said handheld generic smart card terminal includes:
   a generic token personality logic;
   a smart card reader adapted to receive and communicate with a smart card;
   a display for communicating token data derived from a token device personality to a user for transmission to said remote secure application; and
   an interface, said interface communicating with a client computer;
   receiving at said smart card reader said smart card having data stored thereon;
   generating the token device personality based on said data stored on the smart card;
   deriving the token data from the generated token device personality; and
   accessing said remote secure application using said token data derived from said token device personality;
   wherein said terminal remains generic until said smart card is received and communicated with by said smart card reader includes a processor providing a firewall to protect said smart card.

69. The terminal of claim 1 further including a battery.

70. The terminal of claim 69 wherein said battery is replaceable.

71. The terminal of claim 10 wherein said user input comprises application data to be signed.

72. The terminal of claim 1, further comprising a processor, wherein said processor is responsive to an upgrade potential for initiating an upgrade function to install upgraded programs retrieved from an upgrade program source.

73. The terminal of claim 72 wherein said smart card reader is adapted to receive and identify an upgrade smart card, and wherein said upgrade smart card is said upgrade program source.

74. The terminal of claim 72 wherein processor responds to an upgrade potential signaled by connected computing equipment and wherein said connected computing equipment is said upgrade program source.

75. The terminal of claim 73 which includes a display, keyboard and battery.

76. The terminal of claim 75 wherein said battery is replaceable.

77. The terminal of claim 74 which includes a display, keyboard and battery.

78. The terminal of claim 77 wherein said battery is replaceable.

79. The terminal of claim 1, wherein said interface comprises at least one of an infra red device, scanning device, telephone line connection, network connection, and universal serial bus port.

80. The terminal of claim 13 wherein said data being processed comprises transaction data input by the user and wherein said element of said dynamic credential comprises a signature.

81. The method of claim 68 wherein said terminal:
   receives further data from a connected client computer,
   generates a response to said further data, and
   communicates said response to said client computer.

* * * * *

UNITED STATES PATENT AND TRADEMARK OFFICE
CERTIFICATE OF CORRECTION

| | | |
|---|---|---|
| PATENT NO. | : 8,949,608 B2 | Page 1 of 1 |
| APPLICATION NO. | : 09/789197 | |
| DATED | : February 3, 2015 | |
| INVENTOR(S) | : Frank Hoornaert and Mario Houthooft | |

It is certified that error appears in the above-identified patent and that said Letters Patent is hereby corrected as shown below:

In the claims:

Column 15, line 18, should read:
"least one of time, event, or counter based passwords,"

Column 16, line 65, should read:
"remote application;"

Column 16, line 67, should read:
"client computer; and"

Column 20, line 13, should read:
"reader and includes a processor providing a firewall to pro-"

Signed and Sealed this
Fourteenth Day of July, 2015

Michelle K. Lee
*Director of the United States Patent and Trademark Office*